US009097174B2

(12) United States Patent
Sellnau (10) Patent No.: US 9,097,174 B2
(45) Date of Patent: Aug. 4, 2015

(54) SYSTEM AND METHOD FOR CONDITIONING INTAKE AIR TO AN INTERNAL COMBUSTION ENGINE

(75) Inventor: Mark C. Sellnau, Bloomfield, MI (US)

(73) Assignee: Delphi Technologies, Inc., Troy, MI (US)

( * ) Notice: Subject to any disclaimer, the term of this patent is extended or adjusted under 35 U.S.C. 154(b) by 336 days.

(21) Appl. No.: 13/469,404

(22) Filed: May 11, 2012

(65) Prior Publication Data
US 2013/0298554 A1    Nov. 14, 2013

(51) Int. Cl.
F02B 29/04 (2006.01)
F02B 37/04 (2006.01)
F01P 3/20 (2006.01)
F01P 7/16 (2006.01)

(52) U.S. Cl.
CPC . *F02B 37/04* (2013.01); *F01P 3/20* (2013.01); *F01P 7/165* (2013.01); *F01P 2060/02* (2013.01); *Y02T 10/144* (2013.01)

(58) Field of Classification Search
CPC .............. F01P 3/20; F01P 7/165; F01P 7/14; F17D 1/00; F02B 37/00; F02B 37/10
USPC .................. 60/599, 609, 605.1, 41.01–41.81; 123/41.08, 41.33, 41.55, 41.01–41.81
See application file for complete search history.

(56) References Cited

U.S. PATENT DOCUMENTS

| 4,317,439 | A  | * | 3/1982  | Emmerling ................... 123/563 |
| 6,098,576 | A  | * | 8/2000  | Nowak et al. ............. 123/41.33 |
| 6,405,793 | B1 |   | 6/2002  | Ghodbane et al. |
| 7,063,137 | B2 |   | 6/2006  | Kadle et al. |
| 8,028,522 | B2 |   | 10/2011 | Irmler et al. |
| 2006/0218897 | A1 | * | 10/2006 | Sisken et al. ..................... 60/284 |
| 2008/0066697 | A1 | * | 3/2008  | Raab et al. ................. 123/41.55 |
| 2008/0163855 | A1 | * | 7/2008  | Matthews et al. ........ 123/568.12 |
| 2010/0005822 | A1 | * | 1/2010  | Bering et al. ................... 62/239 |

FOREIGN PATENT DOCUMENTS

| EP | 0515250 B1 | 9/1994 |
| EP | 0999078 B1 | 1/2004 |
| GB | 1281781 A  | 7/1972 |

OTHER PUBLICATIONS

International Patent Application PCT/US11/57842, filed Oct. 26, 2011.

* cited by examiner

*Primary Examiner* — Thomas Denion
*Assistant Examiner* — Kelsey Stanek
(74) *Attorney, Agent, or Firm* — Mark H. Svoboda (57) ABSTRACT

A system for conditioning the intake air to an internal combustion engine includes a means to boost the pressure of the intake air to the engine and a liquid cooled charge air cooler disposed between the output of the boost means and the charge air intake of the engine. Valves in the coolant system can be actuated so as to define a first configuration in which engine cooling is performed by coolant circulating in a first coolant loop at one temperature, and charge air cooling is performed by coolant flowing in a second coolant loop at a lower temperature. The valves can be actuated so as to define a second configuration in which coolant that has flowed through the engine can be routed through the charge air cooler. The temperature of intake air to the engine can be controlled over a wide range of engine operation.

9 Claims, 7 Drawing Sheets

SYSTEM AND METHOD FOR CONDITIONING INTAKE AIR TO AN INTERNAL COMBUSTION ENGINE

STATEMENT REGARDING FEDERALLY SPONSORED RESEARCH OR DEVELOPMENT

This invention was made with government support under Contract No. DE-EE0003258 awarded by the Department of Energy. The government has certain rights in the invention.

BACKGROUND OF THE INVENTION

Near-term regulations (Tier2 Bin 5/Bin 2 and Euro 6) for CAFE, $CO_2$ emissions and regulated emissions including NOx, CO, HC, and particulate matter (PM) are demanding advanced internal combustion (IC) engines with greatly improved combustion processes. While diesel engines are already very efficient, they are challenged in the US to meet future emissions standards at reasonable cost. Gasoline engines are preferred by customers in the US, but the efficiency of gasoline engines is relatively low. Homogeneous Charge Compression Ignition (HCCI) gasoline engines are dual-mode engines that utilize HCCI mode over a very limited low-load operating range. While more efficient and lower emissions when in HCCI mode, the net efficiency on a drive cycle is only a few percent better than a stoichiometric SI engine with variable valve actuation. Alternate compression ignition engines have been proposed that utilize gasoline partially-premixed compression ignition (PPCI). One such engine concept is called gasoline direct-injection compression-ignition (GDCI). GDCI provides low-temperature combustion for high efficiency, low NOx, and low particulate emissions over the complete engine operating range. Low-temperature combustion was achieved using multiple late injection (MLI), intake boost, and moderate EGR. New engine subsystems are needed to implement GDCI for practical automotive applications.

BRIEF SUMMARY OF THE INVENTION

This invention involves conditioning (i.e. controlling the pressure and/or temperature) the intake air to a compression ignition engine, under both steady state and transient engine operating conditions to provide satisfactory performance, emissions, and efficiency over a wide range of engine operating conditions. As used herein, the intake air to the engine is taken to mean the air that is combined with fuel to form a combustible air/fuel mixture. While developed in conjunction with compression ignition engines, the system is not limited to such an engine, but may also find utility with other engines.

An embodiment of a system for conditioning the intake air to an internal combustion engine includes a turbocharger, a first charge air cooler disposed downstream of the turbocharger compressor outlet, and a supercharger disposed downstream from the first charge air cooler. The system further includes a second charge air cooler downstream of the supercharger outlet and upstream from the charge air intake port of the engine. The engine is liquid cooled by a first coolant loop including a first coolant pump that circulates coolant through coolant passages in the engine and through a first radiator. The first and second charge air coolers are liquid cooled, with the coolant for the charge air coolers circulated through a second coolant loop that includes a second coolant pump and a second radiator. A first valve comprising three ports is disposed in the first coolant loop and a second valve comprising three ports is disposed in the second coolant loop. A port on the first valve is connected to a port on the second valve, such that the first valve and the second valve can be controlled to respective positions such that a third coolant loop is defined that includes the coolant passages in the engine and the second charge air cooler.

DETAILED DESCRIPTION OF THE INVENTION

Figure 1:
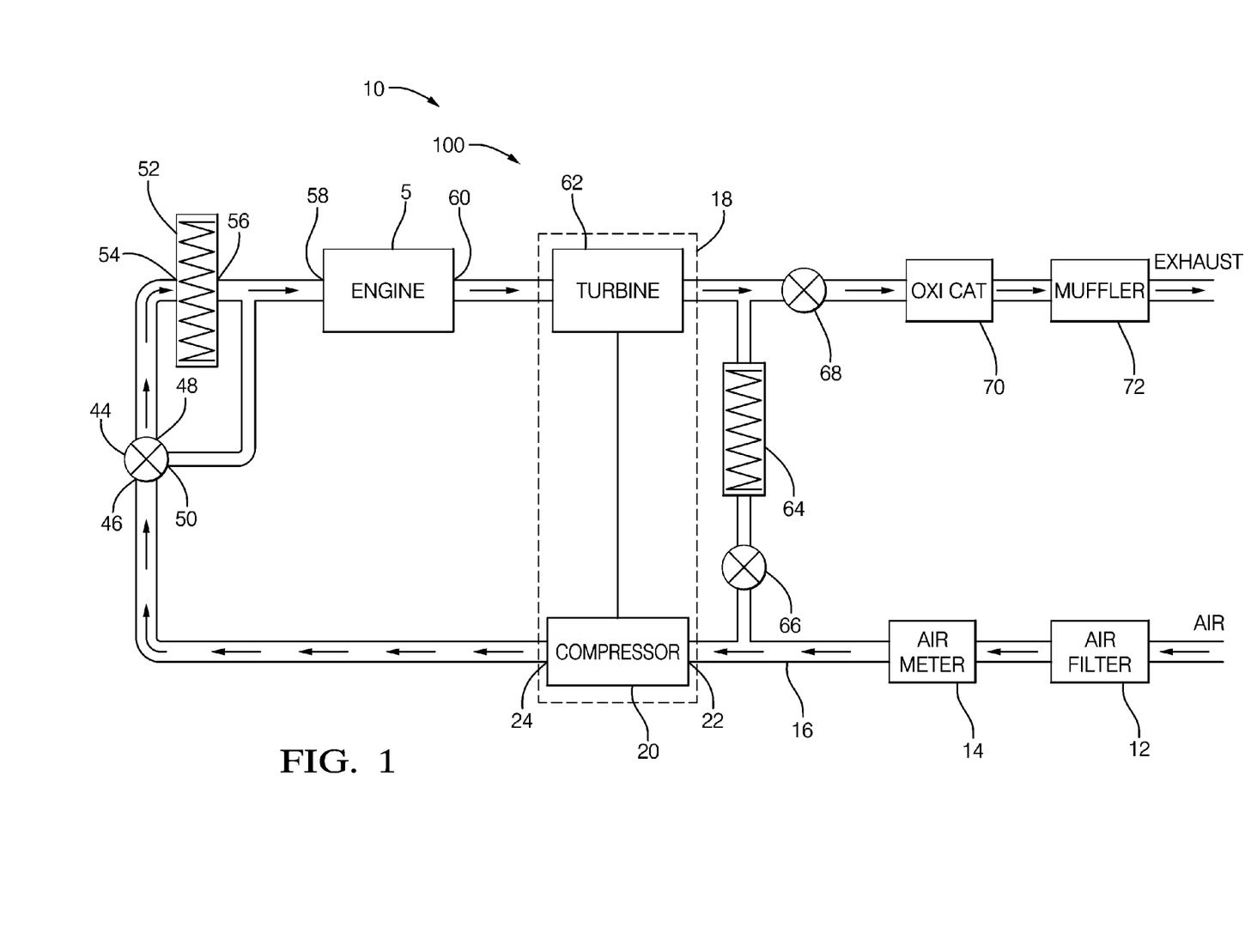
FIG. 1 is a block diagram of the gas side of a system for conditioning engine intake air in accordance with a first embodiment of the invention.

In accordance with a first embodiment of the invention, FIG. 1 illustrates the gas side 100 of a system 10 for conditioning intake air into an engine 5. Referring to FIG. 1, air passes through an air filter 12 and a mass airflow sensor 14 into an air duct 16. The air duct 16 channels air into the air inlet 22 of the compressor 20 of a turbocharger 18. Air is then channeled from the air outlet 24 of the compressor 20 to the air inlet 46 of a charge air cooler bypass valve 44. The charge air cooler bypass valve 44 in FIG. 1 allows air entering the first port 46 to be controllably channeled to the second port 48, to the third port 50, or to be blended to both the second port 48 and to the third port 50. Air that is channeled through the second port 48 of the charge air cooler bypass valve 44 enters an air inlet port 54 of a charge air cooler 52, through which the air passes by way of an air outlet port 56 of the charge air cooler 52 to the charge air intake port 58 of the engine 5. Air that is channeled through the third port 50 of the charge air cooler bypass valve 44 passes directly to the charge air intake port 58 of the engine 5 without passing through the charge air cooler 52.

Still with reference to FIG. 1, engine exhaust gas exits an exhaust port 60 of the engine 5 and is channeled to the turbine of the turbocharger 18. Exhaust gas exiting the turbine 62 can follow one of two paths. A portion of the exhaust gas may pass through an EGR cooler 64 and an EGR valve 66, to be reintroduced into the intake air stream at air duct 16. The remainder of the exhaust gas that is not recirculated through the EGR system passes through a backpressure valve 68, a catalytic converter 70, and a muffler 72, to be exhausted out a tail pipe.

Figure 2:
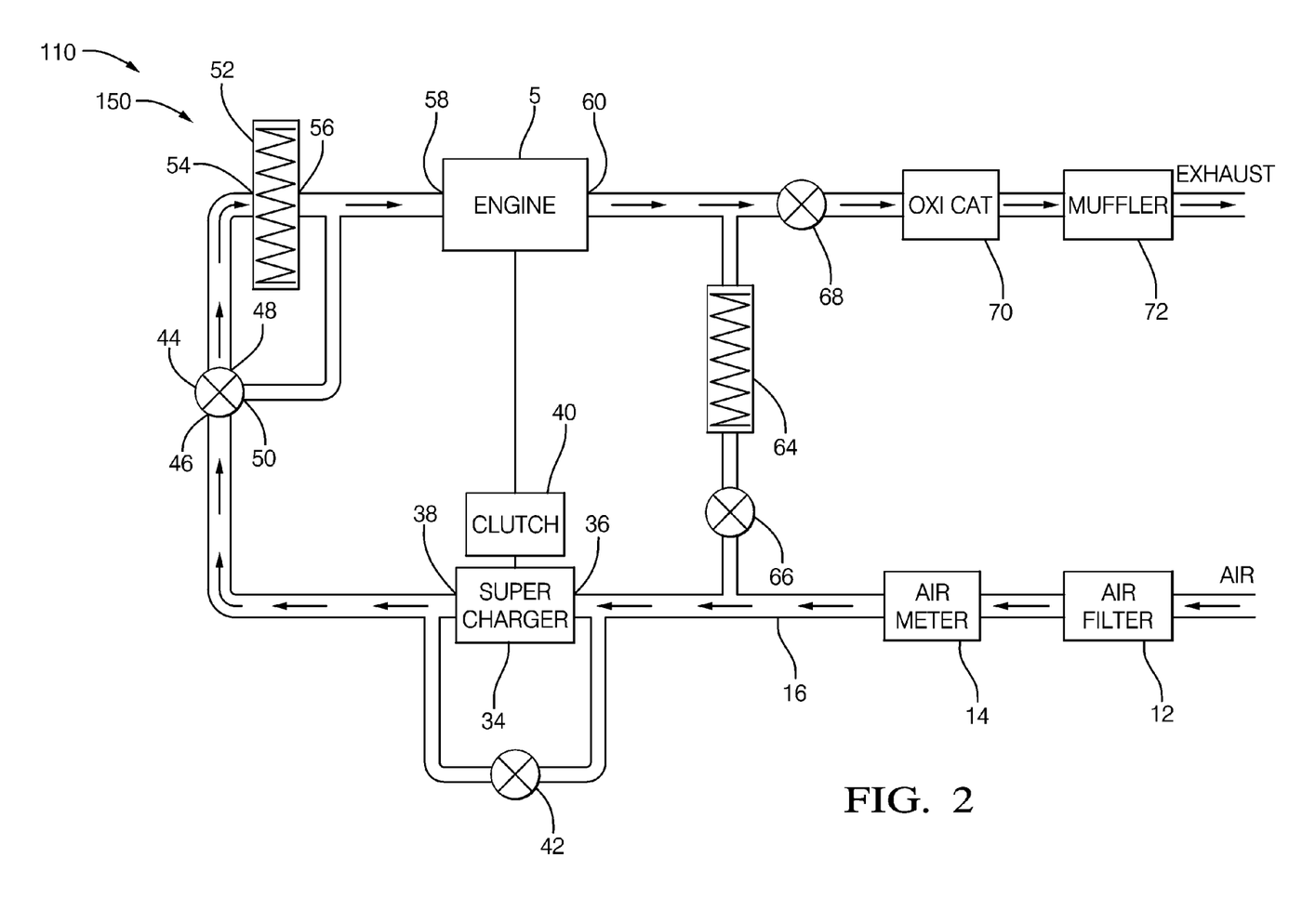
FIG. 2 is a block diagram of the gas side of a system for conditioning engine intake air in in accordance with a second embodiment of the invention.

FIG. 2 illustrates the gas side 150 of a system 110 for conditioning intake air into an engine 5 in accordance with a second embodiment of the invention. The embodiment of FIG. 2 is similar to the embodiment of FIG. 1, the main difference being that the intake air is boosted by a supercharger in the embodiment of FIG. 2, whereas boost is achieved using a turbocharger in the embodiment of FIG. 1. Referring to FIG. 2, air passes through an air filter 12 and a mass airflow sensor 14 into an air duct 16. The air duct 16 channels air into the air inlet 36 of a supercharger 34. Air is then channeled from the air outlet 38 of the supercharger 34 to the air inlet 46 of a charge air cooler bypass valve 44. The charge air cooler bypass valve 44 in FIG. 2 allows air entering the first port 46 to be controllably channeled to the second port 48, to the third port 50, or to be blended to both the second port 48 and to the third port 50. Air that is channeled through the second port 48 of the charge air cooler bypass valve 44 enters an air inlet port 54 of a charge air cooler 52, through which the air passes by way of an air outlet port 56 of the charge air cooler 52 to the charge air intake port 58 of the engine 5. Air that is channeled through the third port 50 of the charge air cooler bypass valve 44 passes directly to the charge air intake port 58 of the engine 5 without passing through the charge air cooler 52.

Still with reference to FIG. 2, engine exhaust gas exits an exhaust port 60 of the engine 5. Exhaust gas exiting the exhaust port 60 can follow one of two paths. A portion of the exhaust gas may pass through an EGR cooler 64 and an EGR valve 66, to be reintroduced into the intake air stream at air duct 16. The remainder of the exhaust gas that is not recirculated through the EGR system passes through a backpressure valve 68, a catalytic converter 70, and a muffler 72, to be exhausted out a tail pipe.

It will be appreciated from the foregoing description of FIGS. 1 and 2 that the focus of FIGS. 1 and 2 is on the transport and conditioning of gas constituents, i.e. air into the engine 5 and exhaust gas out of the engine 5. Some of the components in FIGS. 1 and 2 affect the temperature and/or the pressure of the gas flowing through the component. For example the turbocharger compressor 20 and the supercharger 34 can increase both the temperature and the pressure of air flowing therethrough. The charge air cooler 52 and the EGR cooler 64 are each heat exchangers that affect the temperature of the gas (air or exhaust gas) flowing therethrough by transferring heat from the gas to another medium. In the embodiments of FIGS. 1 through 4, the other heat transfer medium is a liquid coolant, discussed in further detail in relation to FIGS. 3 and 4.

Figure 3:
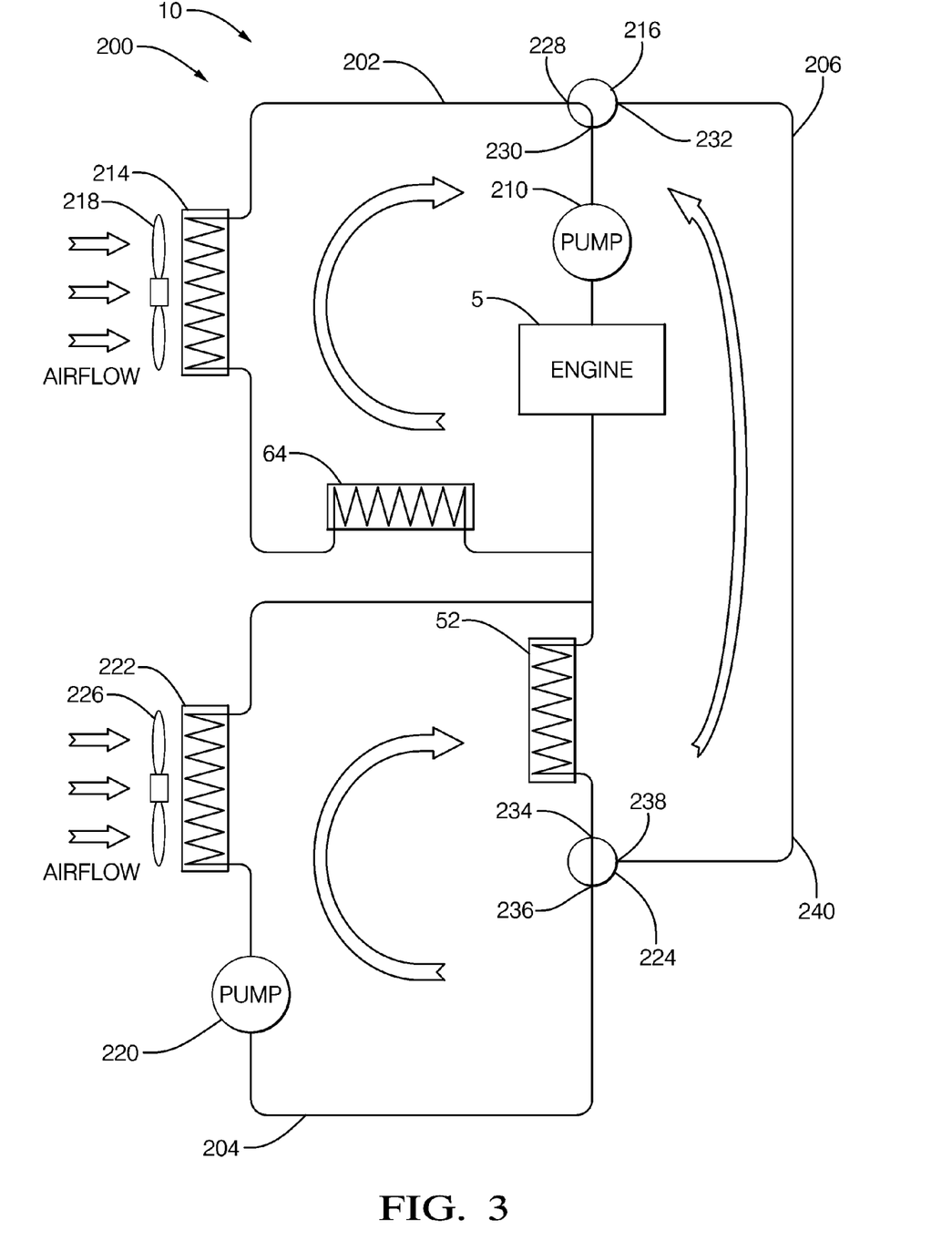
FIG. 3 is a block diagram of the coolant side of a system for conditioning engine intake air in a first configuration in accordance with the first or second embodiment of the invention.

FIG. 3 depicts the coolant side 200 of the system 10 for conditioning intake air into an engine 5. FIG. 3 includes several components such as the engine 5, the charge air cooler 52, and the EGR cooler 64 that were previously discussed with respect to their functions in the gas sides 100, 150 of the systems depicted in FIGS. 1 and 2. The coolant system may further include an oil cooler, a heater core, temperature sensing device, pressure sensing device, a thermostat, and/or other components not shown in FIG. 3.

Referring to FIG. 3, the coolant side 200 of the system 10 for conditioning intake air includes a first coolant loop 202. The first coolant loop 202 includes a first coolant pump 210 configured to urge liquid coolant through coolant passages in the engine 5, the EGR cooler 64, a first radiator 214, and a first three-way coolant valve 216, the function of which will be described later. The first coolant pump 210 may conveniently be a mechanical pump driven by rotation of the engine 5. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 2, the coolant side 200 of the system 10 further includes a second coolant loop 204. The second coolant loop 204 includes a second coolant pump 220 configured to urge liquid coolant through a second radiator 222, the charge air cooler 52, and a second three-way coolant valve 224. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214, in which case the second air supply means 226 would not be required.

The first three-way coolant valve 216 has a first port 228, a second port 230, and a third port 232. The second three-way coolant valve 224 has a first port 234, a second port 236, and a third port 238. The system 10 further includes a conduit 240 fluidtightly connecting the third port 232 of the first three-way coolant valve 216 to the third port 238 of the second three-way coolant valve 224.

FIG. 3 depicts the coolant side 200 of the system 10 with the first three-way coolant valve 216 and the second three-way coolant valve 224 each positioned to provide a first configuration for the coolant side 200. In this configuration, the first three-way coolant valve 216 and the second three-way coolant valve 224 are positioned such that the first coolant pump 210 supplies coolant through the first coolant loop 202, that is, coolant flows from the first coolant pump through coolant passages in the engine 5, through the EGR cooler 64, through the first radiator 214, through the first three-way coolant valve 216 from first port 228 to second port 230, and back to the inlet of the first coolant pump 210. The first coolant loop as shown in FIG. 3 is essentially a conventional coolant loop used in cooling internal combustion engines. The first coolant pump 210 may be a mechanical pump driven by the engine, with a flow rate that is related to engine speed. The controllable first air supply means 218 may be controlled so as to remove heat from the coolant flowing through the first radiator 214 to achieve a target coolant temperature in the first coolant loop 202. By way of nonlimiting example, the controllable first air supply means 218 may be a variable speed fan, with the speed controlled to achieve a coolant temperature of about 80 degrees C. at the outlet of the engine 5.

In the first configuration as shown in FIG. 3, the second coolant pump supplies coolant through the second coolant loop 204, that is, coolant flows from the second coolant pump 220 through the second radiator 222, the charge air cooler 52, from first port 234 to second port 236 of the second three-way coolant valve 224, and back to the inlet of the second coolant pump 220. The second coolant pump 220 may be a variable speed pump driven by an electric motor. The second coolant pump 220 and/or the second air supply means 226 may be controlled so as to remove heat from the coolant flowing through the second radiator 222 to achieve a target coolant temperature in the second coolant loop 204. By way of non-limiting example, the controllable second air supply means 226 may be a variable speed fan, with the speed of the fan 226 and/or the speed of the second coolant pump 220 controlled to achieve a coolant temperature of about 40 degrees C. at the inlet of the charge air cooler 52.

Figure 4:
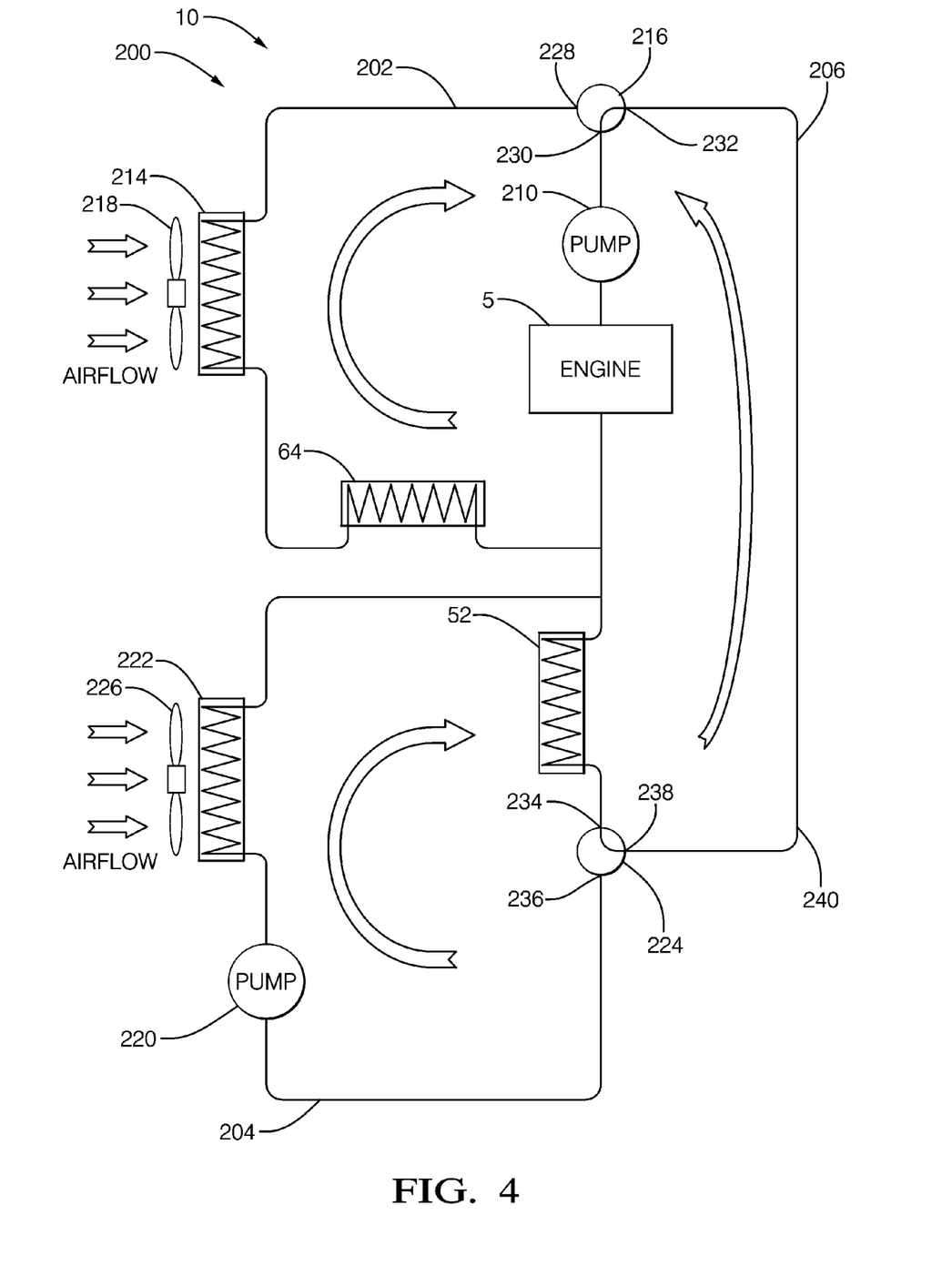
FIG. 4 is a block diagram of the coolant side of a system for conditioning engine intake air in a second configuration in accordance with the first or second embodiment of the invention.

FIG. 4 depicts the coolant side 200 of the system 10 with the first three-way coolant valve 216 and the second three-way coolant valve 224 each positioned to provide a second configuration for the coolant side 200. It will be appreciated that FIG. 4 differs from FIG. 3 only in the representation of the internal flow paths within the first three-way coolant valve 216 and the second three-way coolant valve 224. In this configuration, the first three-way coolant valve 216 and the second three-way coolant valve 224 are positioned so as to define a third coolant loop 206. In the second valve configuration as shown in FIG. 3, the first coolant pump 210 supplies coolant through the third coolant loop 206, that is, coolant flows from the first coolant pump through coolant passages in the engine 5, through the second charge air cooler 52, through the second three-way coolant valve 224 from the first port 234 to the third port 238, through the conduit 240, through the first three-way coolant valve 216 from the third port 232 to the second port 230, and back to the inlet of the first coolant pump 210.

Figure 5:
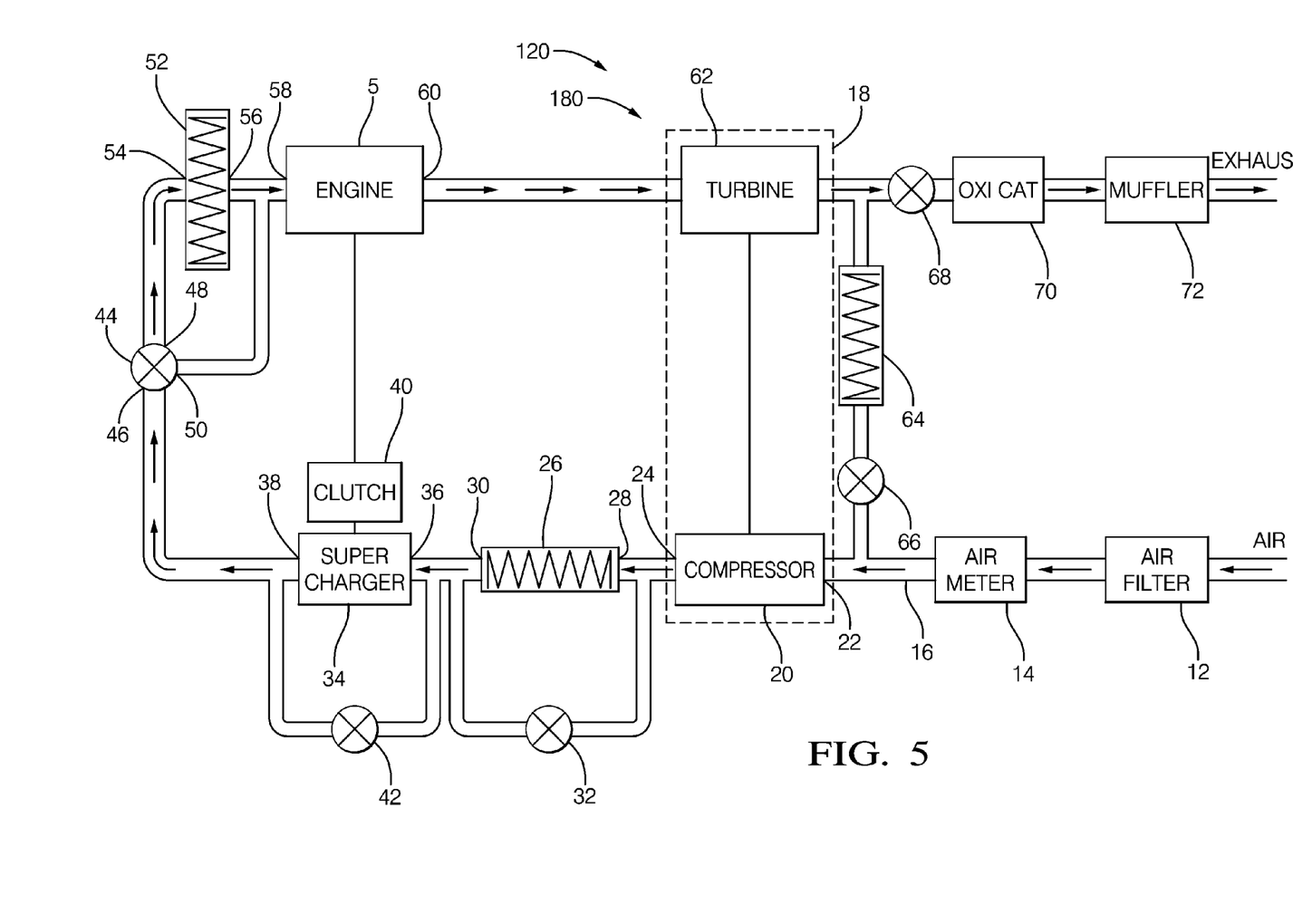
FIG. 5 is a block diagram of the gas side of a system for conditioning engine intake air in accordance with a third embodiment of the invention.

In accordance with a third embodiment of the invention, FIG. 5 illustrates the gas side 160 of a system 120 for conditioning intake air into an engine 5. Referring to FIG. 5, air passes through an air filter 12 and a mass airflow sensor 14 into an air duct 16. The air duct 16 channels air into the air inlet 22 of the compressor 20 of a turbocharger 18. Air is then channeled from the air outlet 24 of the compressor 20 to the air inlet 28 of a first charge air cooler 26. The air outlet 30 of the first charge air cooler 26 is connected to the air inlet 36 of a supercharger 34. A first charge air cooler bypass valve 32 is connected between the air inlet 28 and the air outlet 30 of the first charge air cooler 26 to controllably divert air around the first charge air cooler 26.

Continuing to refer to FIG. 5, air at the air outlet 30 of the first charge air cooler 26 is channeled to the air inlet 36 of a supercharger 34, which is driven by the engine 5 through a controllable clutch 40. The air from the air outlet 38 of the supercharger 34 is channeled to a first port 46 of a second charge air cooler bypass valve 44. The second charge air cooler bypass valve 44 in FIG. 5 allows air entering the first port 46 to be controllably channeled to the second port 48, to the third port 50, or to be blended to both the second port 48 and to the third port 50. Air that is channeled through the second port 48 of the second charge air cooler bypass valve 44 enters an air inlet port 54 of a second charge air cooler 52, through which the air passes by way of an air outlet port 56 of the second charge air cooler 52 to the charge air intake port 58 of the engine 5. Air that is channeled through the third port 50 of the second charge air cooler bypass valve 44 passes directly to the charge air intake port 58 of the engine 5 without passing through the second charge air cooler 52.

Still with reference to FIG. 5, engine exhaust exits an exhaust port 60 of the engine 5 and is channeled to the turbine of the turbocharger 18. Exhaust exiting the turbine 62 can follow one of two paths. A portion of the exhaust may pass through an EGR cooler 64 and an EGR valve 66, to be reintroduced into the intake air stream at air duct 16. The remainder of the exhaust that is not recirculated through the EGR system passes through a backpressure valve 68, a catalytic converter 70, and a muffler 72, to be exhausted out a tail pipe.

Figure 6:
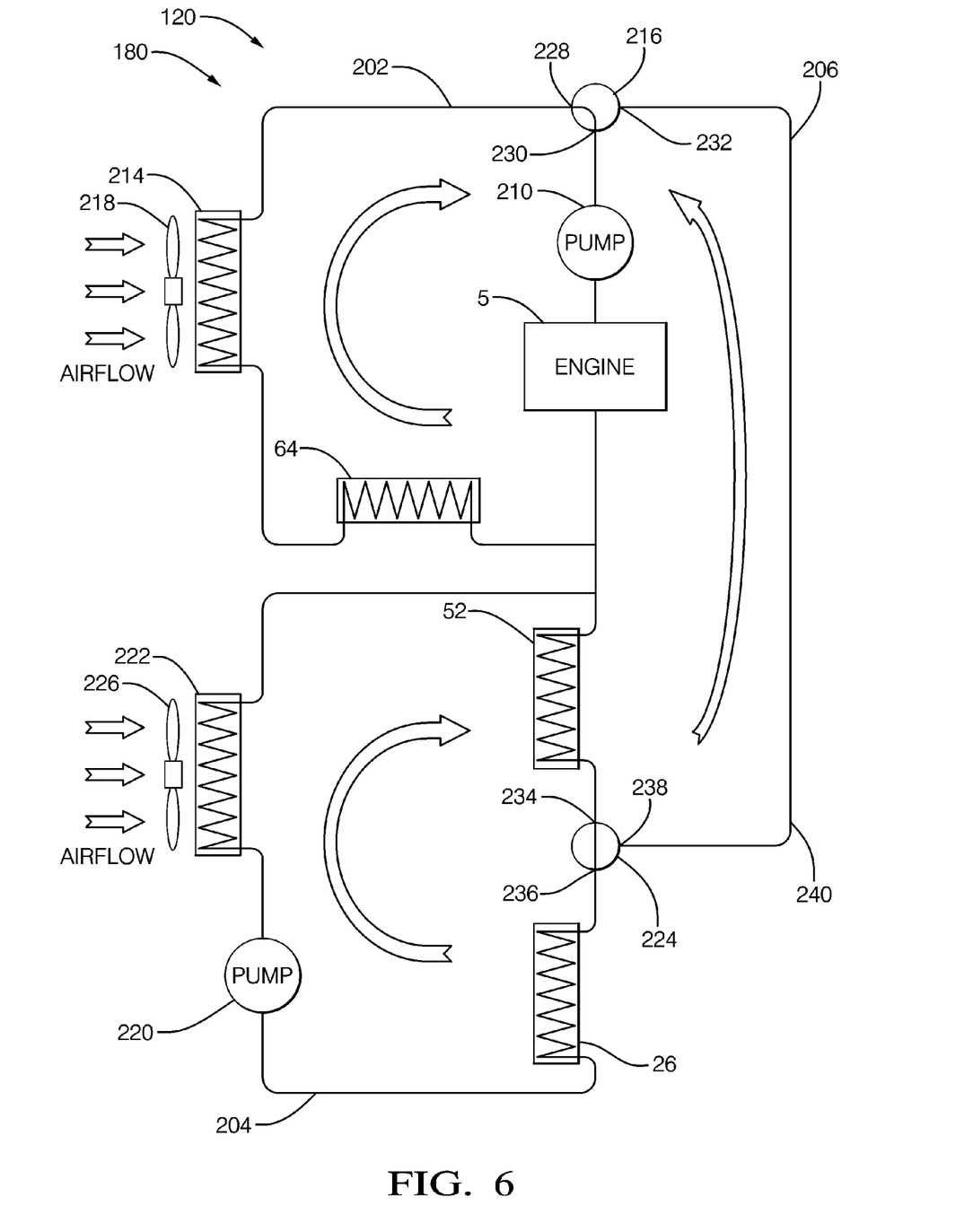
FIG. 6 is a block diagram of the coolant side of a system for conditioning engine intake air in a first configuration in accordance with the third embodiment of the invention.
Figure 7:
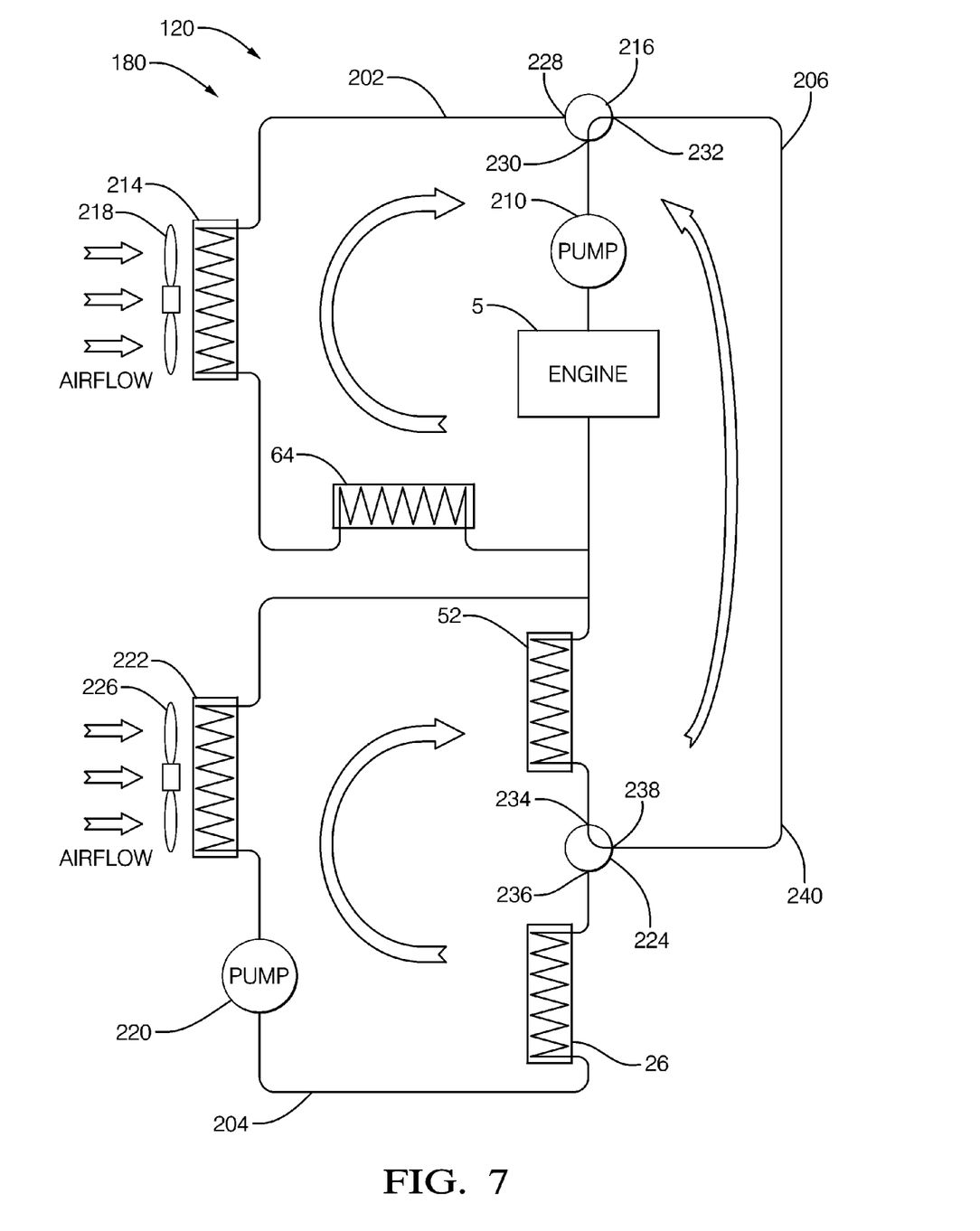
FIG. 7 is a block diagram of the coolant side of a system for conditioning engine intake air in a second configuration in accordance with the third embodiment of the invention.

It will be appreciated from the foregoing description of FIG. 5 that the focus of FIG. 5 is on the transport and conditioning of gas constituents, i.e. air into the engine 5 and exhaust gas out of the engine 5. Some of the components in FIG. 5 affect the temperature and/or the pressure of the gas flowing through the component. For example the turbocharger compressor 20 and the supercharger 34 each increase both the temperature and the pressure of air flowing therethrough. The first charge air cooler 26, the second charge air cooler 52, and the EGR cooler 64 are each heat exchangers that affect the temperature of the gas (air or exhaust gas) flowing therethrough by transferring heat from the gas to another medium. In the embodiment of FIGS. 5 through 7, the other heat transfer medium is a liquid coolant, discussed in further detail in relation to FIGS. 6 and 7.

FIG. 6 depicts the coolant side 180 of the system 120 for conditioning intake air into an engine 5 in accordance with the third embodiment of the invention. FIG. 6 includes several components such as the engine 5, the first charge air cooler 26, the second charge air cooler 52, and the EGR cooler 64 that were previously discussed with respect to their functions in the gas side 160 of the system 120 depicted in FIG. 5. The coolant system may further include an oil cooler, a heater core, a temperature sensing device, a pressure sensing device, a thermostat, and/or other components not shown in FIG. 6.

Referring to FIG. 6, the coolant side 180 of the system 120 for conditioning intake air includes a first coolant loop 202. The first coolant loop 202 includes a first coolant pump 210 configured to urge liquid coolant through coolant passages in the engine 5, the EGR cooler 64, and a first radiator 214, and a first three-way coolant valve 216, the function of which will be described later. The first coolant pump 210 may conveniently be a mechanical pump driven by rotation of the engine 5. The first radiator 214 may conveniently be a conventional automotive radiator with a controllable first air supply means 218 configured to urge air over the first radiator 214. Preferably the first air supply means 218 comprises a variable speed fan, but the first air supply means 218 may alternatively comprise, by way of non-limiting example, a single speed fan, a two speed fan, a fan of any sort in conjunction with one or more controllable shutters, or the like, without departing from the inventive concept.

Continuing to refer to FIG. 6, the coolant side 200 of the system 10 further includes a second coolant loop 204. The second coolant loop 204 includes a second coolant pump 220 configured to urge liquid coolant through a second radiator 222, the second charge air cooler 52, a second three-way coolant valve 224, and the first charge air cooler 26. The second radiator 222 may conveniently be a conventional automotive radiator with a controllable second air supply means 226 configured to urge air over the second radiator 222. Preferably the second air supply means 226 comprises a variable speed fan, but the second air supply means 226 may alternatively comprise, by way of non-limiting example, a single speed fan, a two speed fan, a fan of any sort in conjunction with one or more controllable shutters, or the like, without departing from the inventive concept. Alternately, the second radiator 222 may be positioned in line with the first radiator 214 such that the first air supply means 218 urges air over both the second radiator 222 and the first radiator 214, in which case the second air supply means 226 would not be required.

The first three-way coolant valve 216 has a first port 228, a second port 230, and a third port 232. The second three-way coolant valve 224 has a first port 234, a second port 236, and a third port 238. The system 10 further includes a conduit 240 fluidtightly connecting the third port 232 of the first three-way coolant valve 216 to the third port 238 of the second three-way coolant valve 224.

FIG. 6 depicts the coolant side 180 of the system 120 with the first three-way coolant valve 216 and the second three-way coolant valve 224 each positioned to provide a first configuration for the coolant side 180. In this configuration, the first three-way coolant valve 216 and the second three-way coolant valve 224 are positioned such that the first coolant pump 210 supplies coolant through the first coolant loop 202, that is, coolant flows from the first coolant pump through coolant passages in the engine 5, through the EGR cooler 64, through the first radiator 214, through the first three-way coolant valve 216 from first port 228 to second port 230, and back to the inlet of the first coolant pump 210. The first coolant loop as shown in FIG. 6 is essentially a conventional coolant loop used in cooling internal combustion engines. The first coolant pump 210 may be a mechanical pump driven by the engine, with a flow rate that is related to engine speed. The controllable first air supply means 218 may be controlled so as to remove heat from the coolant flowing through the first radiator 214 to achieve a target coolant temperature in the first coolant loop 202. By way of nonlimiting example, the first controllable air supply means 218 may be a variable speed fan, with the speed controlled to achieve a coolant temperature of about 80 degrees C. at the outlet of the engine 5.

In the first configuration as shown in FIG. 6, the second coolant pump supplies coolant through the second coolant loop 204, that is, coolant flows from the second coolant pump 220 through the second radiator 222, the second charge air cooler 52, from first port 234 to second port 236 of the second three-way coolant valve 224, through the first charge air cooler 26, and back to the inlet of the second coolant pump 220. The second coolant pump 220 may be a variable speed pump driven by an electric motor. The second coolant pump 220 and/or the second air supply means 226 may be controlled so as to remove heat from the coolant flowing through the second radiator 222 to achieve a target coolant temperature in the second coolant loop 204. By way of nonlimiting example, the controllable second air supply means 226 may be a variable speed fan, with the speed of the fan 226 and/or the speed of the second coolant pump 220 controlled to achieve a coolant temperature of about 40 degrees C. at the inlet of the second charge air cooler 52.

FIG. 7 depicts the coolant side 180 of the system 120 with the first three-way coolant valve 216 and the second three-way coolant valve 224 each positioned to provide a second configuration for the coolant side 200. It will be appreciated that FIG. 7 differs from FIG. 6 only in the representation of the internal flow paths within the first three-way coolant valve 216 and the second three-way coolant valve 224. In this configuration, the first three-way coolant valve 216 and the second three-way coolant valve 224 are positioned so as to define a third coolant loop 206. In the second valve configuration as shown in FIG. 3, the first coolant pump 210 supplies coolant through the third coolant loop 206, that is, coolant flows from the first coolant pump through coolant passages in the engine 5, through the second charge air cooler 52, through the second three-way coolant valve 224 from the first port 234 to the third port 238, through the conduit 240, through the first three-way coolant valve 216 from the third port 232 to the second port 230, and back to the inlet of the first coolant pump 210.

In addition to being operable to configure the coolant side 200 to one of the first configuration (as depicted in FIG. 3 or FIG. 6) and the second configuration (as depicted in FIG. 4 or FIG. 7) described above, preferably the first three-way coolant valve 224 and the second three-way coolant valve 224 in the coolant side 200 of the system 10 are operable to allow blending of coolant. For example, the first three-way coolant valve 216 is preferably operable to allow coolant from the first coolant loop 202 and coolant from the third coolant loop 206 to be blended and routed to the first coolant pump 210. Similarly, the second three-way coolant valve 224 is preferably operable to allow coolant passing through the charge air cooler 52 to be split into a first portion that is routed through the second coolant loop 204 and a second portion that is routed through the third coolant loop 206.

In the configurations depicted in FIG. 6 and FIG. 7, the second charge air cooler 52 and the first charge air cooler 26 are arranged so that coolant flows through each in series. It is also possible to arrange the second charge air cooler 52 and the first charge air cooler 26 in parallel, that is, so that the coolant inlets of the second charge air cooler 52 and the first charge air cooler 26 are fluidly connected. In such a parallel configuration, the coolant outlet of the first charge air cooler 26 may be directly connected to the coolant outlet of the second charge air cooler 52, i.e. fluidly connected to the first port 234 of the second three-way coolant valve 224. Alternately the coolant outlet of the first charge air cooler 26 may be fluidly connected to third port 236 of the second three-way coolant valve 224. It will be appreciated that a parallel arrangement as described herein offers the advantage of lower pressure drop through the second coolant loop 204, and is considered to be within the scope of the present invention.

The systems 10, 110, 120 as described above and depicted in FIGS. 1-7 allows control of the temperature and pressure of the intake air to the engine 5 over a wide range of operating conditions. The discussion below relative to Table 1 is directed to the embodiment of system 120 depicted in FIGS. 5-7, but it will be appreciated that a similar description is applicable to the embodiments depicted in FIGS. 1-4, with the "second charge air cooler 52" in the embodiment of FIGS. 5-7 corresponding to the charge air cooler 52 of FIGS. 1-4, and the "second charge air cooler bypass valve 44" in the embodiment of FIGS. 5-7 corresponding to the charge air cooler bypass valve 44 in the embodiment of FIGS. 1-4.

Table 1 below summarizes a number of potential operating modes for the system 120.

TABLE 1

Operating Modes

| Mode Description | First coolant pump | Second coolant pump | Second charge air cooler bypass | Three-way coolant valve configuration |
|---|---|---|---|---|
| I. Cold Start | On | Off | Yes –> No | Second |
| II. Transition | On | On | No | Blend |
| III. Warm engine | On | On | No | First |
| IV. CAC bypass | On | On | Yes | First |
| V. Warm idle | On | On | No | Blend |
| VI. Winter idle | On | Off | No | Second |

Referring to Table 1, Mode I may be used when starting a cold engine. In Mode I, the first coolant pump 210 is on, and the second coolant pump 220 is off. On an initial cold start, the coolant is not yet heated, but some heat is added to the charge air by the supercharger 34. For this reason, the second charge air cooler bypass valve 44 (in FIG. 5) is initially in a position to bypass air around the second charge air cooler 52, so as to not lose the heat supplied by the supercharger to the liquid coolant. The first three-way coolant valve 224 and the second three-way coolant valve 224 are configured to the second configuration described above and depicted in FIG. 7. In this mode, the engine 5 heats the coolant, which is circulated through the second charge air cooler 52 and returned to the first coolant pump 210 through the third coolant loop 206. As the coolant temperature rises to a level where the coolant can supply more heat to the charge air than the heat available from the supercharger 34 alone, the charge air cooler bypass valve 44 is turned off, allowing the charge air to be heated by the warm coolant in the second charge air cooler 52. Mode I is used to rapidly heat the intake air to the engine 5 under cold start conditions.

Still referring to Table 1, Mode II may be used as the coolant through the engine 5 and the second charge air cooler 52 transitions above a target temperature but when the engine is not yet fully warm. In Mode II, the first three-way coolant valve 224 and the second three-way coolant valve 224 are configured to blend coolant flows through the first coolant loop 202, the second coolant loop 204, and the third coolant loop 206, as described earlier. Both the first coolant pump 210 and the second coolant pump 220 are on. The second charge air cooler bypass valve 44 (in FIG. 5) is in a position to not bypass air around the second charge air cooler 52.

Mode III in Table 1 may be used for normal operation when the engine is warm. In Mode III both the first coolant pump 210 and the second coolant pump 220 are both operating to maintain target temperatures in the engine 5 and in the second charge air cooler 52. The second charge air cooler bypass valve 44 (in FIG. 5) is in a position to not bypass air around the second charge air cooler 52. In Mode III, the first three-way coolant valve 224 and the second three-way coolant valve 224 are configured to the first configuration described above and depicted in FIG. 6, such that coolant is separately circulated through the first coolant loop 202 by the first coolant pump 210, and coolant is also separately circulated through the second coolant loop 204 by the second coolant pump 220.

Mode IV in Table 1 is similar to Mode III with the exception of the second charge air cooler 52 being bypassed by the second charge air cooler bypass valve 44 in Mode IV. Mode IV may be advantageous to achieve improved control of inlet air temperature to the engine 5 under certain load transient conditions.

Still referring to Table 1, the configuration of Mode VI is similar to the configuration of Mode I. For idling the engine at very low ambient temperatures, it may be advantageous to route high temperature coolant from the coolant passages of the engine 5 through the second charge air cooler 52 to achieve a desired intake air charge temperature at the charge air intake port 58 of the engine 5.

A method for conditioning the intake air to an internal combustion engine includes controlling one or more devices to achieve and maintain a targeted intake air temperature to the engine over a range of steady-state and transient engine operating conditions. The devices to be controlled in the gas (i.e. air and exhaust) portion of the engine system may include a turbocharger 18, a supercharger clutch 40, one or more charge air coolers 26, 52, air bypass valves 32, 44 around one or more of the charge air coolers 26, 52, an air bypass valve 42 around the supercharger 34, an EGR valve 66, and an exhaust backpressure valve 68. The devices to be controlled in the coolant portion of the engine system may include one or more coolant pumps 210, 220, one or more coolant valves 216, 224, and one or more air supply means 218, 226. The method may include positioning the coolant valves 216, 224 under certain engine operating conditions to define two distinct loops through which coolant flows: a high temperature first coolant loop 202 that includes coolant flowing through the coolant passages in the block of the engine 5, and a low temperature second coolant loop 204 that includes coolant flowing through one or more liquid cooled charge air coolers 52, 26. The method may further include positioning the coolant valves 216, 224 under certain engine operating conditions to define a third coolant loop 206 that includes coolant flowing through the coolant passages in the block of the engine 5 and through the liquid cooled charge air cooler 52. The method may further include positioning the coolant valves 216, 224 under certain conditions such that coolant is routed through the first coolant loop 202, second coolant loop 204, and third coolant loop 206 simultaneously. The method may include determining the coolant temperature at one or more locations within the coolant system 180 and controlling the aforementioned devices to maintain temperatures at target values. By way of nonlimiting example, the method may control the aforementioned devices such that the temperature of the charge delivered to the engine is at a nominal value of 50 degrees C., such that the temperature of coolant discharged from the coolant passages in the block of the engine 5 is at a nominal value of 80 degrees C., and such that the temperature of coolant entering the charge air cooler 52 is at a nominal value of 40 degrees C.

In a further aspect of the invention, a control apparatus is provided comprising a processor, a memory device, and interface devices configured to provide control signals to devices, possibly including but not limited to pumps, valves, clutches, and/or fans, that may be actuated in a controlled fashion in the course of performing the method described above. The memory device stores instructions that, when executed, cause the apparatus to carry out steps of the method. The processor is preferably a digital microprocessor and the memory device is preferably a digital storage device. Other controller implementations as are known in the art, including but not limited to dedicated analog and digital electronic circuitry, are within the scope of the control apparatus as applied to the present invention.

While this invention has been described in terms of embodiments thereof, it is not intended to be so limited, but rather only to the extent set forth in the claims that follow.

I claim:

1. A system for conditioning intake air to an internal combustion engine, the system comprising:
   a boost means for increasing the pressure of the intake air to the engine, said boost means comprising a boost air inlet and a boost air outlet;
   a liquid cooled charge air cooler having a charge air cooler coolant inlet and a charge air cooler coolant outlet, the charge air cooler further having a charge air cooler air inlet and a charge air cooler air outlet, the charge air cooler air inlet fluidly configured to receive air from the boost air outlet and the charge air cooler air outlet fluidly configured to supply intake air to the engine;
   a first coolant loop including
   a first coolant pump,
   coolant passages through the engine,
   a first valve having a first port, a second port, and a third port, the first port of the first valve and the second port of the first valve connected to fluid conduits in the first coolant loop, and
   a first radiator configured to exchange heat between liquid coolant in the first coolant loop and air blown across the first radiator;
   a second coolant loop including
   a second coolant pump,
   the charge air cooler coolant inlet and the charge air cooler coolant outlet,
   a second valve having a first port, a second port, and a third port, the first port of the second valve and the second port of the second valve connected to fluid conduits in the second coolant loop, and
   a second radiator configured to exchange heat between liquid coolant in the second coolant loop and air blown across the second radiator;
   wherein the third port of the first valve and the third port of the second valve are fluidly connected, thereby enabling the first valve and the second valve to be controlled to define a third coolant loop that includes the first coolant pump, the coolant passages through the engine, and the charge air cooler.

2. The system of claim 1, further including a first air supply means configured to urge air across the first radiator.

3. The system of claim 2 wherein the first air supply means is controllable to control the amount of air urged across the first radiator.

4. The system of claim 2 wherein the first air supply means is configured to urge air across the second radiator.

5. The system of claim 1 further including a second air supply means configured to urge air across the second radiator.

6. The system of claim 5 wherein the second air supply means is controllable to control the amount of air urged across the second radiator.

7. The system of claim 1 wherein the second coolant pump is controllable to control the coolant flow rate through the second coolant loop.

8. The system of claim 1 wherein the first valve and the second valve are controllable so as to allow coolant to be blended by the first coolant valve and the second coolant valve so as to flow through the first coolant loop, the second coolant loop, and the third coolant loop simultaneously.

9. A system for conditioning the intake air to an internal combustion engine, the system comprising:
   a turbocharger comprising a compressor having a compressor air inlet and a compressor air outlet;
   a first charge air cooler having a first charge air cooler air inlet and a first charge air cooler air outlet, the first charge air cooler air inlet fluidly connected to receive air from the compressor air outlet;
   a supercharger having a supercharger air inlet and a supercharger air outlet, the supercharger air inlet fluidly connected to receive air from the first charge air cooler air outlet;
   a second charge air cooler having a second charge air cooler air inlet and a second charge air cooler air outlet, the second charge air cooler air inlet fluidly connected to receive air from the supercharger air outlet and the second charge air cooler air outlet fluidly configured to supply intake air to the engine;
   wherein the engine is liquid cooled by means of coolant circulated through a first coolant loop by a first coolant pump, the first coolant loop including
   coolant passages in the engine block,
   a first valve having a first port, a second port, and a third port, the first port of the first valve and the second port of the first valve connected to fluid conduits in the first coolant loop, and
   a first radiator configured to exchange heat from liquid coolant in the first coolant loop to air blown across the first radiator by a first controllable air supply means;
   wherein the first charge air cooler and the second charge air cooler are liquid cooled by coolant circulated through a second coolant loop by a controllable second coolant pump, the second coolant loop further including
   a second valve having a first port, a second port, and a third port, the first port of the second valve and the second port of the second valve connected to fluid conduits in the second coolant loop,
   a second radiator configured to exchange heat from liquid coolant in the second coolant loop to air blown across the second radiator by a second controllable air supply means;
   wherein the third port of the first valve and the third port of the second valve are fluidly connected, thereby enabling the first valve and the second valve to be controlled to define a third coolant loop that includes the first coolant pump, the coolant passages in the engine block, and the second charge air cooler.

* * * * *